(12) United States Patent
Veneruso

(10) Patent No.: US 6,641,214 B2
(45) Date of Patent: Nov. 4, 2003

(54) CHAIR WITH IMPROVED CRADLE MOTION, PARTICULARLY FOR AIRCRAFTS

(75) Inventor: Alberto Veneruso, Latina (IT)

(73) Assignee: Aviointeriors S.p.A., Latina (IT)

( * ) Notice: Subject to any disclaimer, the term of this patent is extended or adjusted under 35 U.S.C. 154(b) by 0 days.

(21) Appl. No.: 09/564,918

(22) Filed: May 4, 2000

(65) Prior Publication Data

US 2003/0025371 A1 Feb. 6, 2003

(30) Foreign Application Priority Data

Jun. 2, 1999 (IT) .......................... RM99A0349

(51) Int. Cl.[7] .......................... B60N 2/427; B60R 21/00; A61G 15/00
(52) U.S. Cl. .......................... 297/322; 297/317; 297/318; 297/325; 297/216.15; 297/216.19; 297/284.4; 297/343
(58) Field of Search ................................. 297/322, 316, 297/317, 318, 325, 329, 340, 341, 342, 343, 284.4, 216.13, 216.14, 216.15, 219.19

(56) References Cited

U.S. PATENT DOCUMENTS

| | | | | |
|---|---|---|---|---|
| 2,102,979 A | * | 12/1937 | Smith | 297/216.19 |
| 2,725,921 A | * | 12/1955 | Markin | 297/216.15 X |
| 4,650,249 A | * | 3/1987 | Serber | 297/313 |
| 5,112,109 A | * | 5/1992 | Takada et al. | 297/343 |
| 5,244,252 A | * | 9/1993 | Serber | 297/325 X |
| 5,558,399 A | * | 9/1996 | Serber | 297/284.4 |
| 5,622,406 A | * | 4/1997 | Meschkat et al. | 297/318 |
| 5,735,574 A | * | 4/1998 | Serber | 297/284.4 |
| 5,785,384 A | * | 7/1998 | Sagstuen | 297/317 |
| 6,022,074 A | * | 2/2000 | Swedenklef | 297/216.13 X |
| 6,024,406 A | * | 2/2000 | Charras et al. | 297/216.13 X |
| 6,106,065 A | * | 8/2000 | Carroll | 297/325 X |

* cited by examiner

Primary Examiner—Rodney B. White
(74) Attorney, Agent, or Firm—Baker Botts L.L.P.

(57) ABSTRACT

Chairs employed in economy-class aircraft seating often incline by rotation of the back about a fixed point, usually the rear edge of the fixed seat. While increasing the comfort of one passenger, this form of seat inclination reduces the space available for the passenger seated in the aft seat. A chair with improved cradle motion, particularly for use in aircraft, is described in which inclination may occur with little or no reduction in the space available to surrounding passengers. Inclination is achieved by the contemporaneous forward sliding of the back portion and the seat portion of the chair relative to the fixed seat frame.

6 Claims, 4 Drawing Sheets

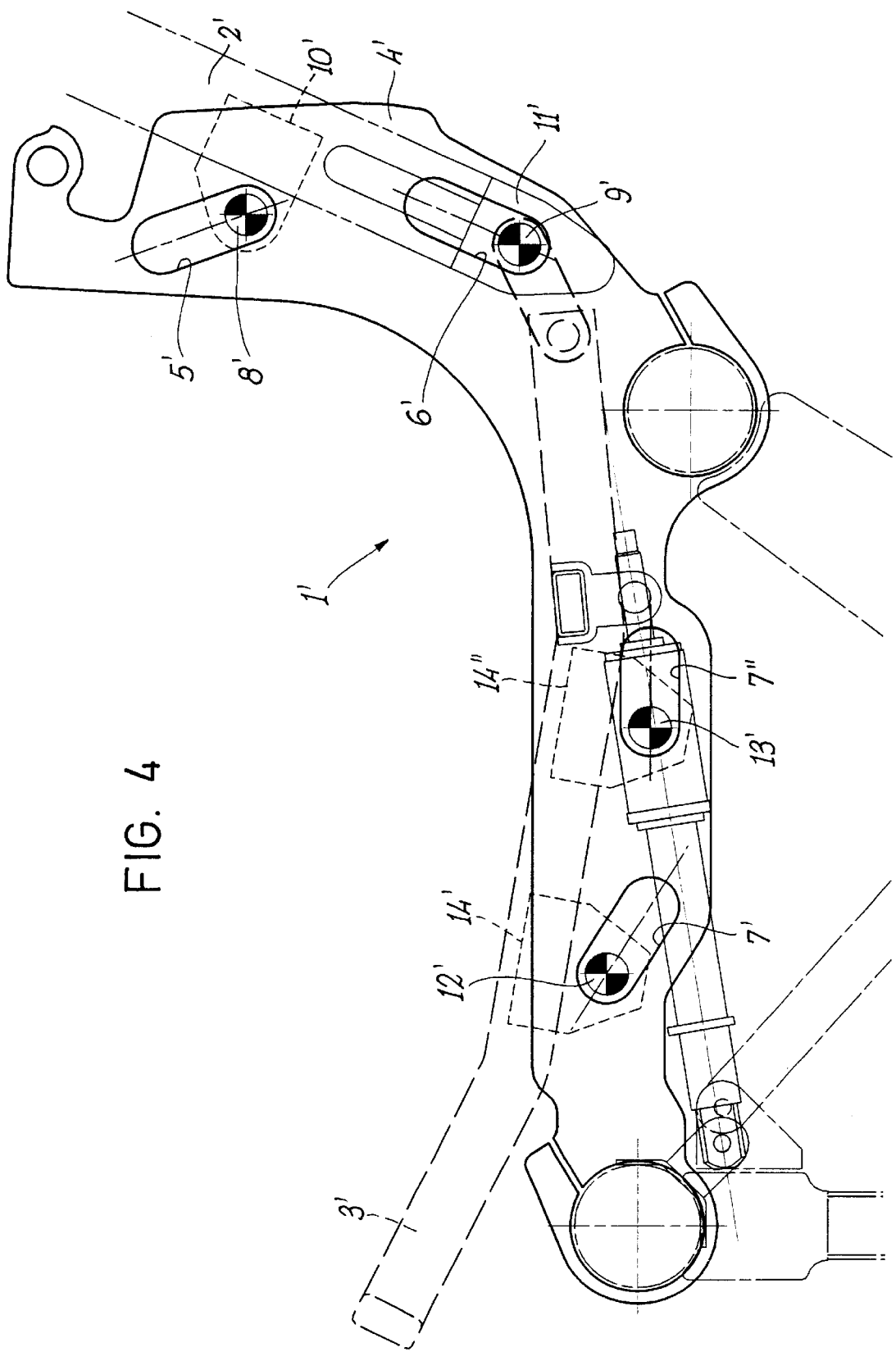

CHAIR WITH IMPROVED CRADLE MOTION, PARTICULARLY FOR AIRCRAFTS

This application claims priority under 35 U.S.C. §119 to Italian Patent Application No. RM99A000349, filed Jun. 2, 1999.

The present invention relates to a chair with improved cradle motion, particularly for aircrafts.

More specifically, the invention relates to an economy and/or business chair, provided with a mechanism allowing to obtain on the same chair a so called cradle motion.

The solution suggested according to the invention can be obviously employed also on a different kind of vehicles.

As it is well known, nowadays, chairs employed in the economy class of the aircrafts are mainly provided with a rotation motion of the back about a fixed point (reclining motion), while the seat remains fixed, or can have a motion connected with the motion of the back.

In this way, in order to try to give to the passenger the best comfort, it is reduced the space available for the passenger of the rear seat.

In chairs employer for upper classes, it has been tried to realise a so called cradle motion, that, besides allowing to obtain a decidedly more comfortable position for the user of the seat, should allow not to interfere with the space available for the other passengers.

It must be further born in mind that in Business class space problems do not exist, which are typical of the economy class.

However, all the solutions already known do not give good results under the technical and functional point of view.

Particularly, under a technical point of view it has not been possible to realise up to day an economy class chair provided with a cradle motion.

Therefore, it does not exist any solution allowing to realise a cradle motion chair, provided on the rear with an openable table.

Business class chair presently used can have this kind of motion since the table is provided on the arm rest of the chair.

Furthermore, known solutions that are used for the Business class provide the cradle motion with the forward translation of the seat and of the back, while the frame of the back remains fixed in the original position, in such a way not to reduce the space of the passenger who is seated behind the chair.

This kind of solution is obviously possible, even if not optimum, for the Business class, since, beside the above mentioned problem of the table, there is a huge of space available, but the same cannot be used for economy class chairs, since there is few available space and the table must be provided just behind the back or the other chair.

Therefore, up to date it has not been realised a solution allowing to have a chair with cradle motion the back of which inclines integrally with its frame and wherein the same back is provided with a table not influenced by the above mention cradle motion.

Furthermore, the known solutions cannot be used both for economy and business class chairs.

These and other results are obtained according to the invention suggesting a technical solution allowing to make the cradle motion of the chair, involving both the back and the seat of the chair.

It is therefore specific object of the present invention a chair with improved cradle motion, particularly for aircrafts, said chair providing a back portion, a seat portion, a basic frame, the chair being characterised in that means are provided for the forward sliding contemporaneously with the forward sliding of the back portion and of the seat portion.

Preferably, according to the invention, said means for the forward sliding contemporaneously with the forward sliding of the back portion and of the seat portion are comprised of slots realised on said basic frame in correspondence of said back and seat portions, pin means being provided on said back and seat portions, slidably coupable along said slots, in such a way to allow to the chair to reach any position.

In a preferred embodiment of the chair according to the invention, two slots are provided in correspondence of the back portion and a slot is provided in correspondence of the seat portion.

According to a further preferred embodiment of the chair according to the invention, two slots are provided in correspondence of the back portion and two slots are provided in correspondence of the seat portion.

Always according to the invention, the motion of said cradle can be manually obtained or it can be obtained by motorised means.

The present invention will be now described, for illustrative but not limitative purposes, according to its preferred embodiments, with particular reference to the figures of the enclosed drawings, wherein:

FIG. 4 is a lateral schematic view of the chair of FIG. 3 in a reclined position.

Figure 1:
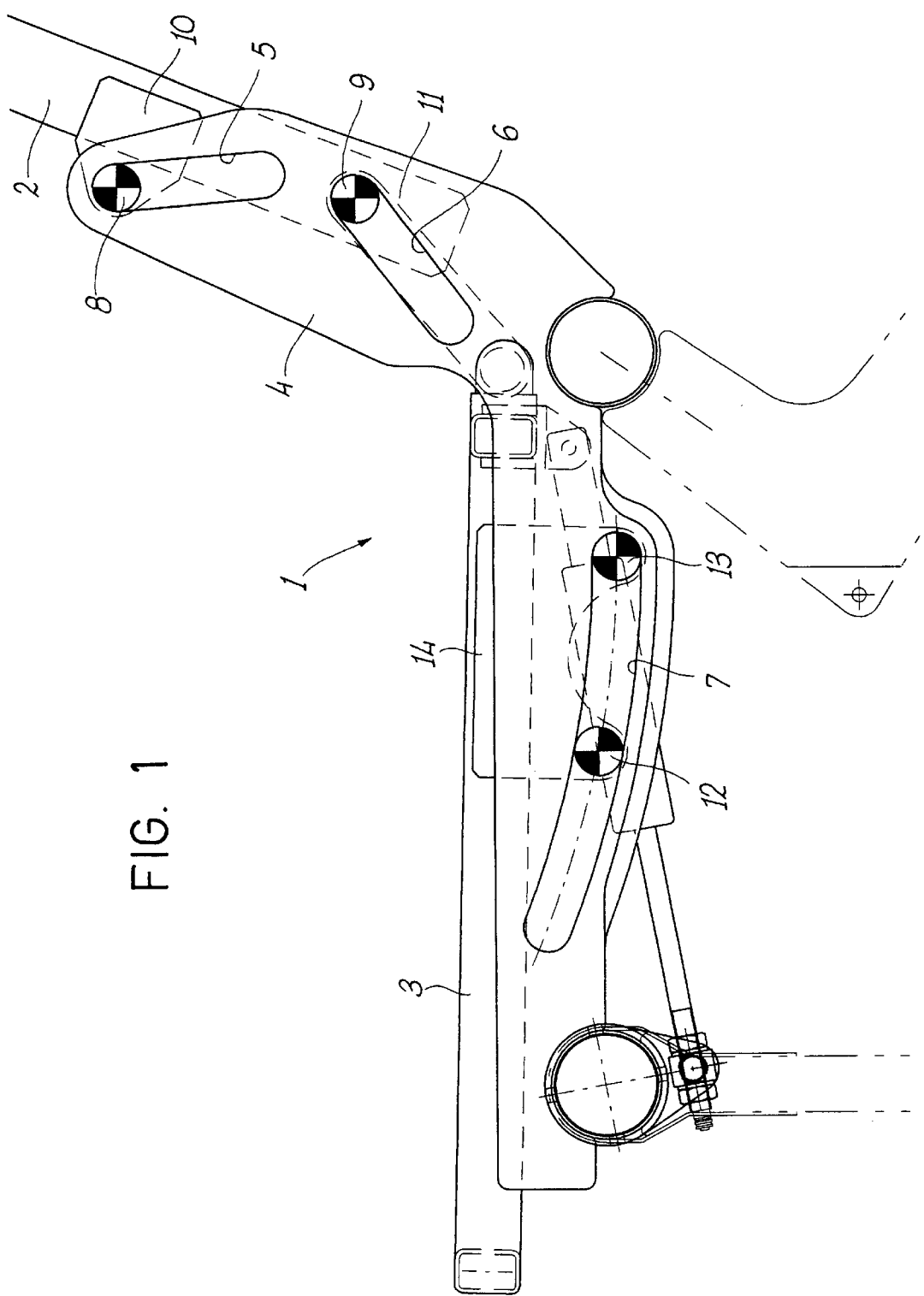
FIG. 1 is a lateral schematic view of an embodiment of an economy class chair according to the invention in an upstanding position.
Figure 2:
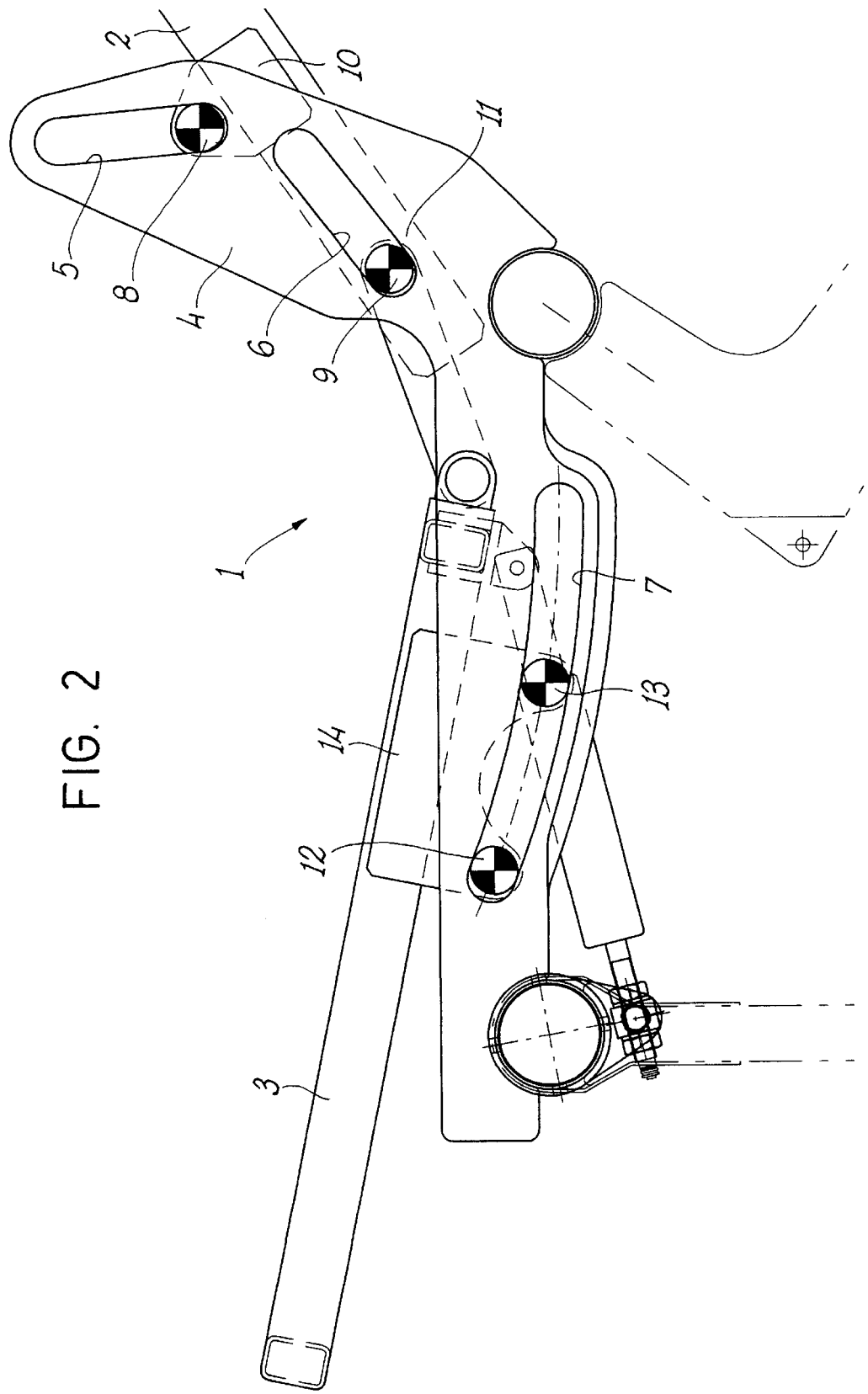
FIG. 2 is a lateral schematic view of the chair of FIG. 1 in a reclined position.

Making reference to the FIGS. 1 and 2, it is schematically shown the frame 1 of an economy class chair, comprising a back portion 2 and a seat portion 3.

In the position shown in FIG. 1, the two portions 2 and 3 are placed each other at a 90° degree position.

Said frame provides a lateral structure 4, that will be symmetrical and identical on the opposite side that cannot be seen from the figure, on which two oblique slots 5, 6 are, in correspondence of the back portion 2 and a slightly curved slot 7, in correspondence of the seat portion 3.

On the back portion 2 two pins 8, 9 are provided, said pins 8, 9 being coupled to said portion 2 by support plates 10, 11, provided in such a way to be able to freely slide along said slots 5, 6, assuming any position between the two end positions shown in FIGS. 1 and 2, respectively.

In the same way, on said seat portion 3 two pins 12 and 13 are provided, said pins 12, 13 being coupled to said portion 3 by the support plate 14 provided in such a way to be able to freely slide along said slot 7, assuming any position between the two end positions shown in FIGS. 1 and 2, respectively.

The solution according to the invention allows to incline the chair without reducing the space available for the passenger on the seat behind, or in any case with a much lower reduction of the same with respect to what happen with the present solutions.

By the operation of suitable actuating, manual or motorised means, which are not part of the present invention and therefore will be not described in greater detail, the chair can be inclined, reaching the position of FIGS. 1 and 2, or being it possible to stop the same in any intermediate position.

Figure 3:
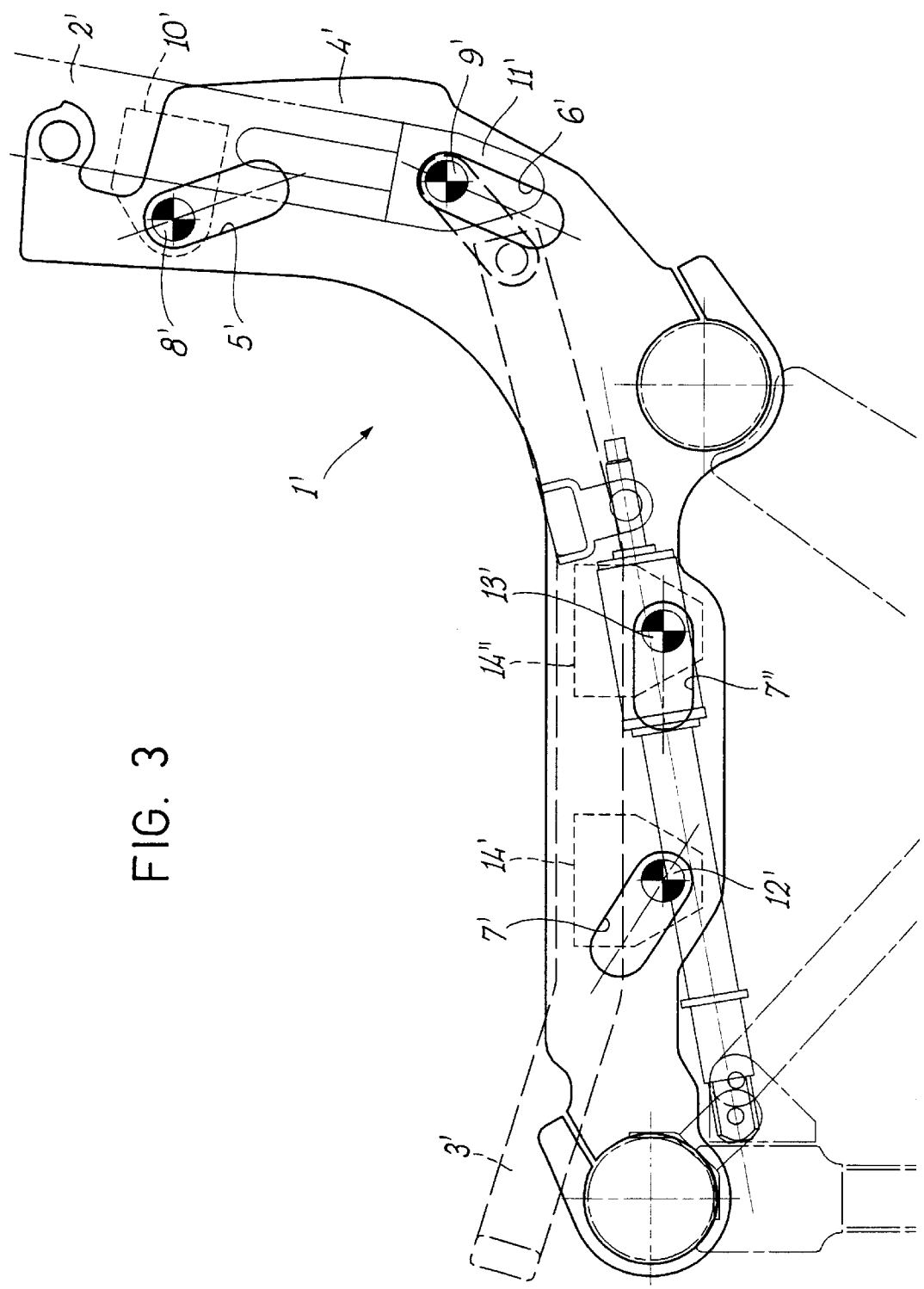
FIG. 3 is a lateral schematic view of an embodiment of an Business class chair according to the invention in an upstanding position.

Coming now to observe FIGS. 3 and 4, wherein the same numeral references followed by ' will be used to indicate similar parts, it is schematically shown the frame 1' of a business class chair, comprising a back portion 2' and a seat portion 3'.

In the position shown in FIG. 3, the two portions 2' and 3' are placed each other at a 90° degrees position.

Said frame provides a lateral structure 4', that will be symmetrical and identical on the opposite side that cannot be seen from the figure, on which two oblique slots 5', 6' are, in correspondence of the back portion 2' and two slightly curved slots 7' and 7", in correspondence of the seat portion 3'.

On the back portion 2' two pins 8', 9' are provided, said pins 8', 9' being coupled to said portion 2' by support plates 10', 11', provided in such a way to be able to freely slide along said slots 5', 6', assuming any position between the two end positions shown in FIGS. 3 and 4, respectively.

In the same way, on said seat portion 3' two pins 12' and 13' are provided, said pins 12', 13' being coupled to said portion 3' by the support plate 14' and 14" provided in such a way to be able to freely slide along said slots 7', 7", assuming any position between the two end positions shown in FIGS. 3 and 4, respectively.

The solution according to the invention allows to incline the chair without reducing the space available for the passenger on the seat behind, or in any case with a much lower reduction of the same with respect to what happen with the present solutions.

By the operation of suitable actuating, manual or motorised means, which are not part of the present invention and therefore will be not described in greater detail, the chair can be inclined, reaching the position of FIGS. 3 and 4, or being it possible to stop the same in any intermediate position.

The present invention has been described for illustrative but not limitative purposes, according to its preferred embodiments, but it is to be understood that modifications and/or changes can be introduced by those skilled in the art without departing from the relevant scope as defined in the enclosed claims.

What is claimed is:

1. A chair, particularly for aircraft, comprising a pair of fixed lateral members on each side of said chair, each said fixed lateral member defining a first slot, a second slot, and a third slot; a back portion comprising two pins on each side of said back portion slidable along the first and second slots in each said fixed lateral member; and a seat portion comprising a pin slidable along the third slot in a said fixed lateral member, wherein inclination of the chair is achieved by contemporaneous forward sliding of the back portion and the seat portion relative to the fixed lateral members.

2. A chair according to claim 1, wherein said seat portion contains two pins in correspondence to two slots attached to said fixed lateral member.

3. A chair according to claim 1, wherein the sliding of the back portion and the seat portion relative to the fixed lateral member is obtained by means selected from the group consisting of manual means and motorized means.

4. A chair according to claim 1, wherein the seat portion comprises two pins slidable in correspondence to two slots in the fixed lateral member.

5. A chair, particularly for aircraft, comprising a fixed lateral member defining a first slot and a second slot, wherein the two slots in the fixed lateral member are obliquely aligned with respect to one another; a back portion comprising two pins slidable in correspondence to the two slots in the fixed lateral member; and a seat portion comprising a pin slidable along a third slot in the fixed lateral member, wherein inclination of the chair is achieved by contemporaneous forward sliding of the back portion and the seat portion relative to the fixed lateral member.

6. A chair, particularly for aircraft, comprising a fixed lateral member defining a first slot and a second slot; a back portion comprising a pin slidable along the first slot in the fixed lateral member; and a seat portion comprising two pins slidable along the second slot in the fixed lateral member, wherein inclination of the chair is achieved by contemporaneous forward sliding of the back portion and the seat portion relative to the fixed lateral member.

* * * * *